United States Patent [19]

Schmid

[11] Patent Number: 5,099,618

[45] Date of Patent: Mar. 31, 1992

[54] METHOD FOR REPAIRING DAMAGED DIGITAL RECORDING DISKS

[76] Inventor: Harald Schmid, Blumenstrasse 15, D-7121 Ingersheim, Fed. Rep. of Germany

[21] Appl. No.: 582,992

[22] Filed: Sep. 14, 1990

Related U.S. Application Data

[63] Continuation of Ser. No. 316,304, Feb. 27, 1989, abandoned.

[30] Foreign Application Priority Data

May 14, 1988 [DE] Fed. Rep. of Germany ....... 3816561

[51] Int. Cl.⁵ .............................................. B24B 1/00
[52] U.S. Cl. .................................. 51/326; 51/281 R; 51/281 SF; 51/34 C; 51/327
[58] Field of Search ..................... 51/72 R, 327, 103 R

[56] References Cited

U.S. PATENT DOCUMENTS

| | | | |
|---|---|---|---|
| 3,571,984 | 3/1971 | Koorneef et al. | 51/281 SF |
| 3,665,483 | 5/1972 | Becker | 346/1 |
| 3,943,666 | 3/1976 | Dion et al. | 51/51 |
| 3,959,934 | 6/1976 | Byrne | 51/317 |
| 4,078,924 | 3/1978 | Keddie et al. | 51/281 R X |
| 4,179,852 | 12/1979 | Barnett | 51/281 SF X |
| 4,201,015 | 5/1980 | Reim | 51/281 R X |
| 4,347,689 | 9/1982 | Hammond | 51/281 SF |
| 4,435,922 | 3/1984 | Prusak | 425/810 X |
| 4,500,484 | 2/1985 | Gregg | 425/810 X |
| 4,514,937 | 5/1985 | Gehrung et al. | 51/281 SF |
| 4,586,296 | 5/1986 | Saunders | 51/281 SF |

FOREIGN PATENT DOCUMENTS

| | | |
|---|---|---|
| 0031570 | 3/1980 | Japan ......................................... 51/51 |
| 59-081058 | 9/1984 | Japan . |
| 59-117735 | 11/1984 | Japan . |
| 0216188 | 9/1986 | Japan . |

OTHER PUBLICATIONS

IBM Technical Disclosure Bulletin, vol. 24, No. 2, Jul. 1981; "Rotary Burnish Head and System"; J. J. Hagopian; IBM Corp. 1981, pp. 993-994.

*Primary Examiner*—Bruce M. Kisliuk
*Assistant Examiner*—John A. Marlott
*Attorney, Agent, or Firm*—McAulay Fisher Nissen Goldberg & Kiel

[57] ABSTRACT

A digital recording disk, such as an audio or a video disk, has a central bearing area, a data medium layer having at least one data track thereon, and a protective layer covering a face of reading of said disk, said protective layer is provided with damages, causing disturbances during a reading operation. Said damages are repaired by removing the protective layer in a section between a central bearing area and a circumferential edge of said disk to a level at which disturbances during reading do not appear. Said removing of said protective layer is carried out in directions cutting across the data track path.

18 Claims, 3 Drawing Sheets

METHOD FOR REPAIRING DAMAGED DIGITAL RECORDING DISKS

This application is a continuation of application Ser. No. 07/316,304, filed Feb. 27, 1989, now abandoned.

The invention relates to a method and to a device for repairing damaged digital recording disks, in particular audio or visual recording disks having a central bearing area for holding and guiding the disk, a data medium layer having at least one data track, and a protective layer covering a reading face of said disk and said data medium layer. The protective layer has damages which cause disturbances during a reading operation. And, these damages require repair or the digital recording disks should be replaced.

Digitally coded disks are broadly used as data carriers or data mediums. Digital audio recording disks, so-called "Compact Disks" (CD) are sound carriers of hitherto unmatched quality in sound reproduction. Digital audio-visual recording disks, so-called "Video Compact Disks", are capable of perfect picture reproduction, even after numerous playbacks.

Usual Compact Disks consist of a disk made of plastic or other synthetic material, said disk having a thickness of about 1.2 mm and a diameter of about 12 cm. The digital information or data is impressed on one side of said disk in the form of small pits. After impressing of said pits, this side is provided with a metallic film and sealed with a resin protective layer. Within a Compact Disk the pits are impressed in a continuous spiral data track similar to that of a conventional grooved gramophone record. Within Video Compact Disks the information is impressed in the form of concentric circles.

Usually, such disks are provided with a central aperture serving for centering a disk on a playback apparatus. Annular bearing areas, having no datas impressed therein, surround said central aperture on both sides of the disks and serve as an annular face for engaging with holding means and driving means of the playback apparatus. The data carrying area of the disk is accessible from one side for reading.

A reading is carried out by a laser beam scanning the disk on that side being opposite to the side into which the pits are impressed, i.e. the beam thus penetrates the approximately 1.2 mm thick plastic protective layer of the disk, is then reflected by the metallic film, runs across the plastic layer again in an opposite direction, and then leaves the disk.

It has been recognized, that damages, for example scratches in the protective plastic layer will disturb the scanning process in such a manner that clearly audible clicks or omission-sounds ("jumps") occur. If the protective layer is damaged extensively, the disk cannot be scanned at all, i.e. the playback apparatus will not operate. Certain playback apparatuses for digital coded disks (CD-players), however, are provided with error-correction devices compensating disturbances in data transmission. Nevertheless, above a predetermined level of tolerance, such disturbances can no longer be compensated.

Even relatively small scratches, resulting from bad handling of the disks, can lead to disturbances or faulty reproduction. The reading beam usually has a diameter of approximately 1.6 $\mu$m and scans a data track of about 0.6 $\mu$m in width. If the plastic protective layer is damaged, for example by scratches, due to a reflection from the V-shaped vertical incisions produced by the scratches, the reading beam may be deflected to such an extent that the beam itself no longer makes contact with the data track to be read. It is, of course, usual for playback apparatuses having at least two further beams on either side of the reading beam, one of said beams runs in front of the reading beam, the other follows on the reading beam. The two additional beams run between neighbouring data tracks and take in the central portion of said data track to be scanned by the reading beam. However, disturbances affecting the three beams in such a way, that the reading beam can no longer scan the correct data track, and can cause a clear acoustic interference.

Damages or scratches running in the direction of the data track, even when they are small, can lead to all three beams being deflected into a neighbouring data track. Depending on the direction of the deflection, an already scanned data track is scanned a second time, or else a data track is "jumped" and the reading beam scans the next data track. Even more sophisticated error-correction devices, working for instance with four laser beams cannot prevent the occurance of distinctly audible acoustic disturbances.

It is therefore an object of the present invention to provide a method and a device for repairing damaged digital recording disks in a simple manner, thereby maintaining their mechanical working characteristics.

The object is achieved by removing parts of the protective layer between said bearing area and a circumferential edge of the disk to such an extent to ensure that disturbances do not appear during a reading operation. The removal of material of the protective layer is carried out in directions cutting across the data track path.

This object is further achieved by a device comprising holding means for receiving and holding the disk to be repaired, and grinding means or a grinding device which can be brought into contact with an appropriate point on the protective layer to be ground in a section between the bearing area and the circumferential edge of the disk, said grinding device being movable in a direction transverse to the direction of the data track.

Incisions and scratches caused by bad handling are eliminated by removal of the the material of the protective layer. Due to the fact that a removing of material occurs solely in an area between the central bearing area and the circumferential edge of the disk the original thickness of the disk is maintained in those areas which are in contact with or engage the playback apparatus, i.e. engaging those parts of the playback apparatus serving for holding, driving and guiding the disk. As a result, the recording disk being grinded or ground according to the invention fits with the playback apparatus without tolerances. Therefore no vibrations or fluttering will occur, as it would be the case if a removal of material had taken place across the overall diameter of the disk. After a removal of material of the protective layer inevitable traces will exist, depending on the kind of removal, for example by grinding. These traces will have an ultimate size, affecting the surface structure of the disk.

Carrying out the grinding operation according to the method of invention, i.e. carrying out the grinding in such a way, that its movement cuts across the data track, preferably in a transverse direction to it, the resulting spaced traces having a size below a predetermined value, no longer affect the reading beam; or are so minimal that their effect is compensated by an existing error-correction device.

Due to the method of the invention, traces produced by the grinding treatment may be greater than traces remaining after a grinding treatment along the direction of the data track path. For example, a grinding trace of 3 μm width completely covers a data track pit of 5 μm length and 0.6 μm width if said grinding trace runs along the direction of the data track path and probably make said pit unreadable. On the other hand, the transverse directed grinding treatment of the invention, said 3 μm grinding trace, leaves enough of a 5 μm pit unaffected that it can certainly be scanned and interpreted, possibly even without the help of an error-correction device.

According to a specific embodiment of invention, for disks having spiral or circular data tracks, removal of the protective layer material takes place in radial directions.

This measure has the advantage, that the data track is tranversed approximately rectangular, i.e. the pits are cut across the shortest possible path. It is therefore ensured, that no interference signals result, even if the grinding traces are relatively deep.

According to a further embodiment of invention the direction of removing material of the protective layer of the disk occurs along angle displaced secants of the circular disk, thereby enclosing an angle α, preferably of 45°.

This measure has the advantage of generating a "cross grinding" pattern due to the material removing action, which leads to a particularly smooth surface structure. In this way an especially uniform removal of surface material over a large area is possible.

According to a further embodiment of the invention the removal of material is carried out in several subsequent grinding operations using step by step smaller grained grinding material in such a way that with the final step a surface quality is achieved corresponding to the quality of a brand new disk.

This method has the advantage, that a very smooth surface structure is achieved being considerably below the tolerance level of an error-correction device. Thus, any further disk damage occuring subsequent to the repair operation, provided it is still within the tolerance level, will not lead immediately to disturbances. This would, however, be the case if the repair operation has produced a merely rough face structure which itself lies only just below the tolerance level of the error-correction.

According to a further embodiment of the invention a grinding paste, containing a liquid, preferably water, is applied.

This measure has the advantage that in particular during the final treatments with small sized grinding materials, the resulting heat due to friction is uniformly transmissible to the paste.

According to a further embodiment of the invention, a removal of protective layers made of plastics occurs under conditions keeping the temperature of the disk below the softening temperature of the plastic material.

This measure has the advantage that the protective layer is subjected purely to mechanical removal, without physical or chemical changes in the plastic material. A local overheating, however, during grinding operation could lead to a softening down to those layers having impacted the pits. This will result in a changing of the structure of the pits and will not cause repairable errors in signal reproduction.

A device according to invention comprises a support plate having a diameter which is equal to or slightly smaller than the diameter of the disk.

This measure has the advantage, that the disk to be treated can be firmly secured to the holding means, and additionally in a space saving manner, and after a grinding operation, it can be inspected closely, for instance with a magnifying glass. The holding means may be constructed either as a fitted and detachable part of the whole device or as a separated individual component, which can be held in the hand during grinding, thus allowing a quick and immediate inspection of the disk after one short operation cycle.

According to a further aspect of the invention, the support plate is provided with an arbor protecting from the plate surface, over which arbor a disk having a central aperture can be slid and fitted.

This measure has the advantage that the disk merely has to be slotted over the arbor and can be removed from it again easily.

The arbor can be formed that a certain degree of friction resistance must be overcome, when the disk is positioned on or removed from it. Furthermore, snapping means can be provided, into which a disk can be snapped in by pressing or unsnapped or snapped out by pulling.

According to a further aspect of invention, the support plate is pivotable and lockable at any angle position.

This measure has the advantage that the disk can thus be turned in any angular position, and after locking can be worked on in that position.

According to a further aspect of the invention, the support plate is covered with a fluff-free cloth, preferably made of cotton.

This measure has the advantage, that this side of the disk resting on the support plate is cushioned on a smooth soft material. As this resting side of the disk is covered only with a relatively thin protective layer, relatively strong pressure forces occuring during grinding at the opposite side of the disk, cause no damages or negative effects by the support plate serving as an abutment.

According to a further aspect of invention, the grinding means is provided with a rotary driven grinding plate being perpendicular to the support plate. The face of said grinding plate runs parallel to the line of grinding operation and its lateral phase actually carries out the grinding operation.

The advantage of this measure is that it allows the use of conventional grinding plates, which can serve as attachments for home drilling machines and similar drive mechanism. Various grinding plates can thus be inserted in the machine or removed from it quickly and simply, in order to meet requirements of different stages in the grinding operation. In combination with a manually held support plate, the whole device can be manufactured as a home-drill attachment, so that the device can be handled in a simple and effective manner.

According to a further aspect of the invention, the grinding plate is covered with a fluff-free polishing cloth, preferably made of cotton.

This measure has the advantage of providing a particularly abrasion proof and fine support for a grinding paste, which can in no way damage the face to be worked.

Further aspects of the invention can be seen from the following specification.

It goes without saying that the features described above and explained in the following are not operational solely in the combination respectively given, but can also be used in other combinations and alone without departing from the scope of the invention.

Preferred embodiments of invention are more closely described and explained in the following in connection with the accompanying drawings.

Figure 1:
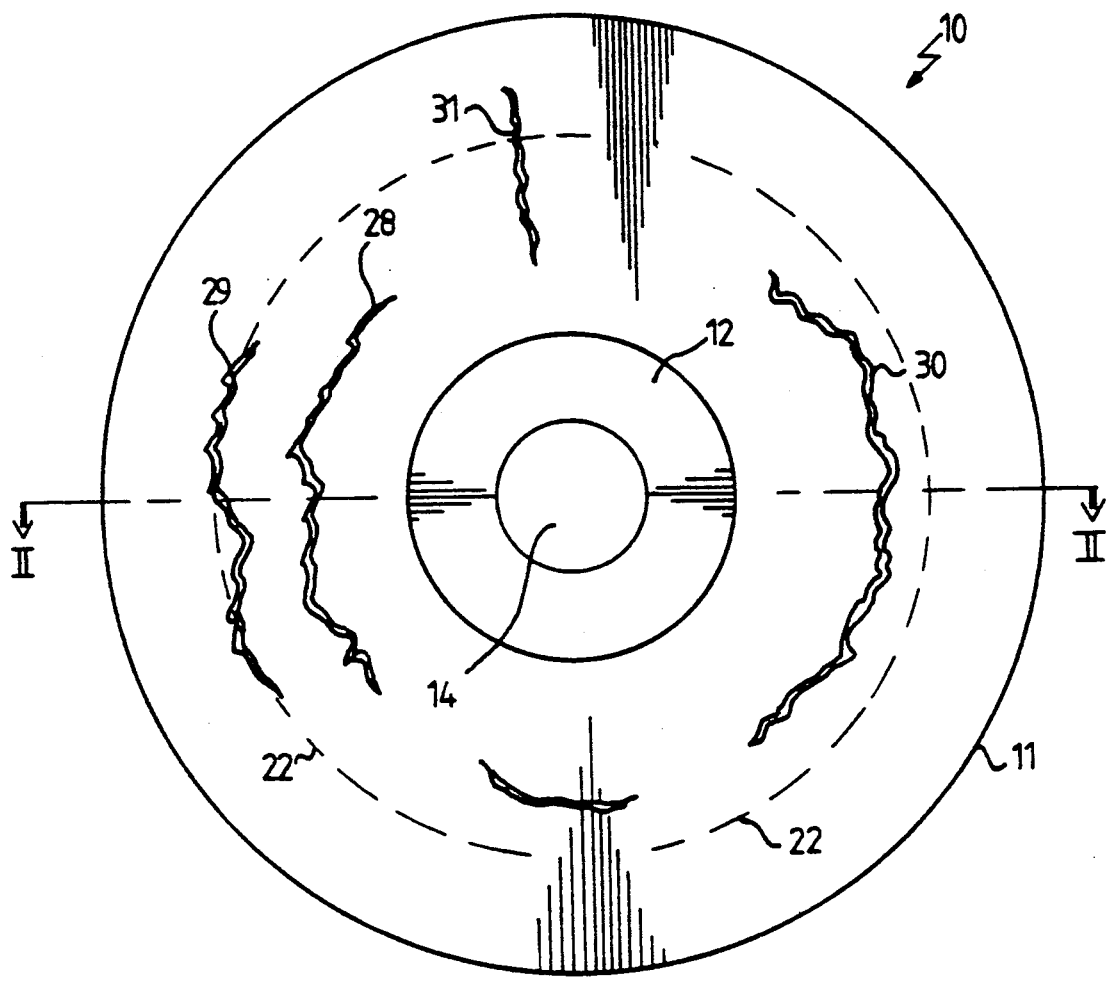
FIG. 1 shows a top view of the data side of a recording disk (Compact Disk) having damages on its surface.

Referring to FIGS. 1 to 4, a digital recording disk is generally designated with reference number 10.

The recording disk 10 in the form of a Compact Disk for audio recording substantially consists of a disk made of a synthetic material with a diameter of approximately 12 cm and a thickness of approximately 1.2 mm. The sectional view in FIG. 2 has been considerably enlarged in the direction of its thickness for reasons of a better understanding.

The disk 10 has a central aperture 14 for receiving centering means or centering pins in a playback apparatus.

The aperture 14 is surrounded by bearing areas 12, 12' on both sides of the disk faces, via which bearing areas 12, 12' the disk 10 fits firmly with corresponding parts of the playback apparatus in order to ensure an exact holding and driving of the disk 10.

A data medium layer 16 on the bottom side of the disk 10 has various data tracks 22 composed of individual impressed pits 24.

FIG. 1 shows one loop of a data track 22 being a single spiralled groove running from the circumferential edge 11 inwardly, as it is usually the case on a compact disk for sound reproduction.

The data medium layer 16 is metallized by a vapour-deposition, of a metal, the resulting metallic layer in turn is covered by a cover layer 17 forming a smooth plain bottom phase of the disk 10.

A reading face 18 of the data medium layer 16, from which face 18 the pit 24 projects in relief is laminated with a protective layer 20 consisting of a synthetic material, for example a resin. In its original form the protective layer 20 has a uniform thickness through the entire disk section of 1.2 mm.

The disk 10 as shown in FIG. 1 has several damages in the form of circular scratches 28, 29, 30 and a radial scratch 31 respectively.

The damages as demonstrated in FIG. 1 are of such dimension, in width and depth that the use of the Compact Disk 10 is out of the question, even with playback apparatus (CD-players) having sophisticated error-corrections.

Figure 2:
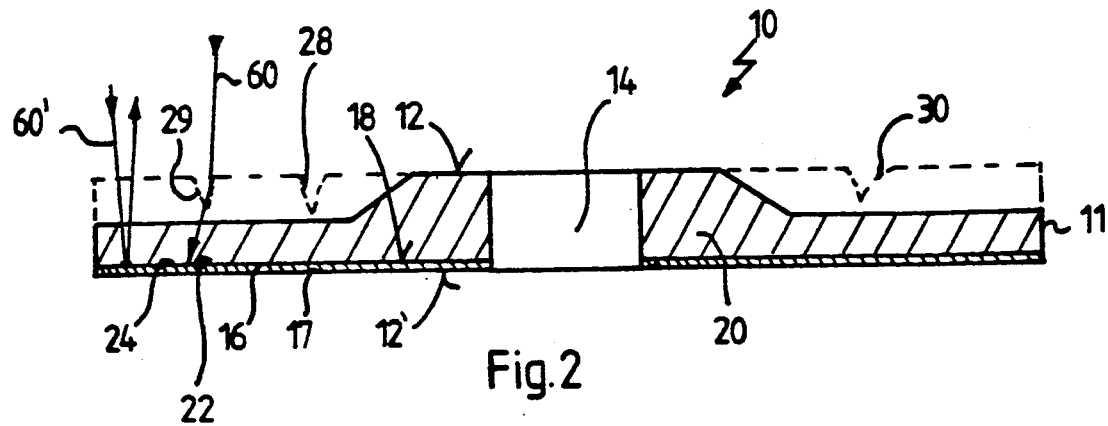
FIG. 2 shows a sectional view of the disk in FIG. 1 along the line II—II after a repairing operation according to invention.

As can be seen from the sectional view in FIG. 2, the scratches 28, 29 and 30 penetrate to approximately half the thickness of the original protective layer 20 as demonstrated in FIG. 2 with dotted lines.

A reading beam 60 incident onto a lateral face of a scratch, for example scratch 29, may be deflected to such an extent that the reading beam 60 no longer reaches the data track 22 beneath the reading horizontal.

Therefore, according to invention, the protective layer 20 of the disk 10 is removed in a section between the bearing area 12 and the circumferential edge 11 to such an extent that the scratches 28, 29, 30, 31 completely disappear.

After such a removal operation the disk 10 looks as demonstrated in FIG. 2. The bearing areas 12, 12' retain their original thickness, so that even a ground or "grinded" disk 10 is maintained in a securely and fixed manner within the holding means of a playback apparatus, which engage the disk only in the bearing areas 12, 12'.

Figure 3:
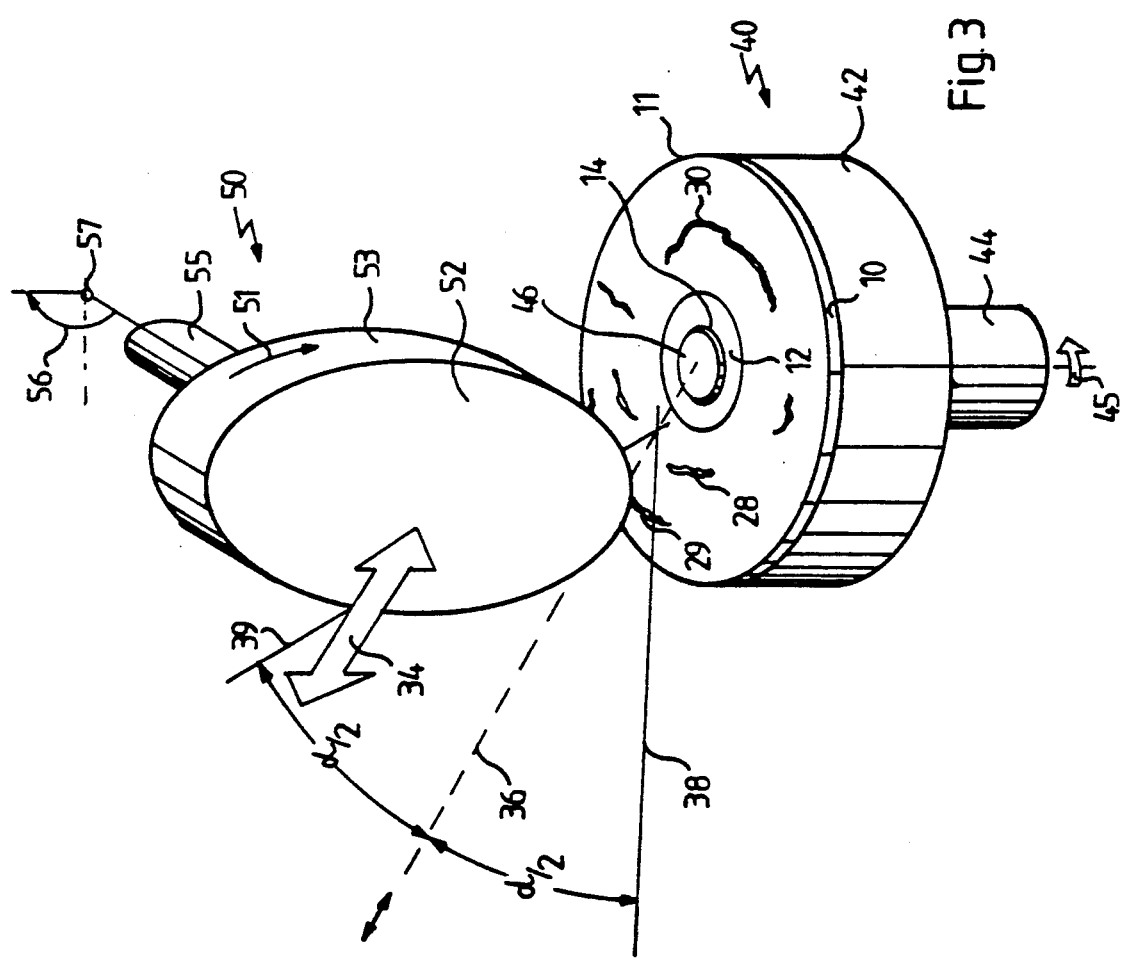
FIG. 3 shows a simplified diagrammatical perspective view of a device for repairing a digital recording disk according to invention.

A device for carrying out such a removal operation for reaching a disk as shown in FIG. 2 is demonstrated in FIG. 3.

Referring now to FIG. 3, a disk 10 is secured to a holding device 40 provided with a horizontal a support plate 40 having a plate face. The diameter of the support plate 42 corresponds approximately to the diameter of the disk 10. The disk 10 is positioned on the support plate 42 in such a way that the damaged surface faces upwardly.

The disk 10 has been slotted over an arbor 46 on the support plate 42. The arbor 46 is composed of a resilient material and is slightly conical in shape. Thus the disk 10 is firmly secured once it has been pressed over and onto the arbor 46.

A peg 44 projects from the bottom side of the support plate 42 which can either be formed as a handle or can act as a pivot which slots or fits into a fixed base (not illustrated). In the latter case, the holding device 40 is provided with a locking mechanism (not shown) allowing the peg 44 to be turned as indicated by an arrow 45 in FIG. 3, but locking it at any angle position desired.

A grinding means 50 is provided with a grinding plate 52 connected via a pin 55 to a drive (not shown), which drives the plate 52 about a longitudinal axis of the pin 55 for example as indicated by an arrow 51 in FIG. 3 or, in the opposite direction.

The pin 55 can be constructed to fit the collar of a conventional electric drill, whose drill serves as a drive mechanism for the grinding plate 52.

The grinding plate 52 can also be made pivotable about an axis 57 as shown in FIG. 3. In the position shown in FIG. 3 the grinding plate 52 rests with its lateral face 53 on the disk 10 which is fixed to the support plate 42. The pivot mechanism will allow the grinding plate 52 to be swivelled out of the position shown in FIG. 3 to an upwardly directed position as indicated by arrow 56. Thus, the disk 10 can be removed from a stationary support plate 42.

A circular face of the grinding plate 52 is perpendicular to the horizontal face of the support plate 42, and during removal or grinding operation it is moved forwards and backwards as indicated by an arrow 34, so that it moves parallel to and along a radius 36 of the support plate 42.

Within the position shown in FIG. 3 the grinding plate 52 has moved from the outer circumferential edge of the bearing area 12 along the radius 36 toward the circumferential edge 11 of disk 10. The rotating lateral face 53 also moves in this direction.

Parts of the scratch 28 have already been removed in an area corresponding to the width of lateral face 53 of the grinding plate 52. In order to work on the remainder of scratch 28, the grinding plate 52 is moved back along a radius toward the center point, i.e. toward the arbor 46 while the support plate 42 is turned, for example in the direction of arrow 45, so that the lateral face 53 of the grinding plate 52 makes contact with the remaining parts of scratch 28 step by step.

A check on the amount of material removed can be made during a first general operation by the naked eye alone. In the following operation steps, this can be carried out with the help of a magnifying glass.

If the scratches are as serious as those illustrated in FIGS. 1 and 2, a relatively coarse grained abrasive is used initially in order to achieve a high level of removal of material. Within the following operation steps successively finer grained abrasives are used in order to obtain a surface as smooth as possible. A fine machining is carried out by using a grinding plate 52 covered with a polishing cloth of fluff-free material, for instance made of 100% pure cotton. As a polishing agent a superfine grained abrasive is used which is available in the trade in the form of a paste. The maximum circumferential rotation speed of the grinding plate 52 is about 5 m/sec. One operation step, i.e. one movement across the surface to be treated in the direction of operation, should not exceed 3 seconds. In this way, the plastic protective layer 20 is prevented from heating up to levels in the range of the softening temperatures of the plastic material. z A treatment as predescribed in radial directions (along arrow 34 or radius 36) produces a grinding pattern of the kind as shown in the upper section of FIG. 4 (indicated as coinciding with the radius coinciding with number 36).

Traces produced by the grinding operation according to the invention coincide with or run along the radii 36, i.e., they run transversely to the spiraled data track 22 and transversely to the pits 24 building said track 22.

A typical pit 24 has a width b of approximately 0.6 $\mu$m, and a distance c between two adjacent data tracks 22 which is approximately 1.6 $\mu$m.

The grain size of the polishing abrasive during the final treatment step and the pressure exerted by the grinding plate 52 to the surface of disk 10 are selected in such a way that a finished surface is produced which will not affect, for example, a scanning by three beams 59, 60, 61. Beam 60 is a central reading beam, running over the pits 24 of the data track 22. Reading beam 60 is accompanied by two lateral scanning beams 59 and 61.

When disk 10 is turned in the direction of arrow 58, beam 59 which is a leading beam runs in front of and besides the reading beam 60. Leading beam 59 is positioned between two adjacent data tracks 22. Following beam 61 which is the last of the three beams in sequence runs behind and besides or next to reading beam 60. Following beam 61 is also positioned between two adjacent data tracks 22.

The grinding traces as indicated with radii 36 do not affect the "orientation" of the guiding beams 59 and 61, i.e. they do not deflect the guiding beams 59, 61 from the correct data track 22 to another incorrect data track. This can be checked by placing the disk 10 after fine polishing either in an ordinary playback apparatus or in a "Quality Control Player" (for example of the type manufactured by the German firm Revox) and examining it audially for signs of acoustic disturbance. Tests carried out on a Revox Quality Control Player have shown, that after a final polishing with an abrasive (for example UBA 0197 0073) and with a fluff-free 100% cotton cloth, disk display values of 20 to 30 are recognized which values are comparable with values of 10 to 20 of a freshly manufactured perfect disk.

Usual playback apparatus or CD-players can suppress or compensate acoustic interference up to a value of 200.

Therefore, values are achievable which far below the tolerance level, so that even small fresh damages on a repaired disk can be compensated up to a certain size.

Within FIG. 3, the secant lines 38 and 39 demonstrate a further embodiment of a grinding operation according to the invention. In this mode, for example, the grinding plate 52 is first moved along the secant 38 and then in a second operational step along secant 39. The two secants 38 and 39 enclose or subtend therebetween an angle $\alpha$ of about 45°.

Figure 4:
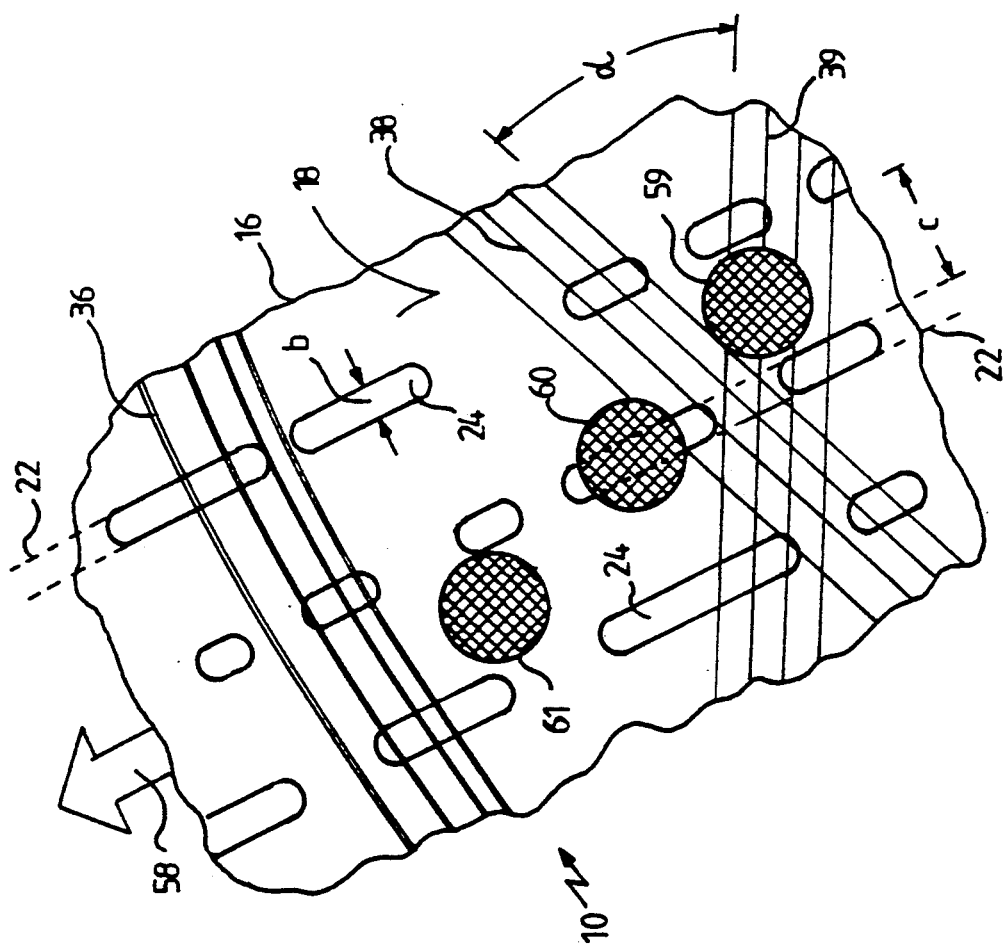
FIG. 4 shows an enlarged view of a part of a recording disk after repairing operations according to invention.

This mode of operation produces a pattern known as a "cross-grinding" finish as demonstrated in the lower part of FIG. 4. The intercrossing grinding traces (as indicated by 38 and 39 in FIG. 4) produce a particularly smooth and plane surface on the disk 10. Provided, the final used abrasive is very fine, said "cross-grinding" cannot affect the pits 24 on the data track.

I claim:

1. A method for repairing a damaged rigid digital recording disk for recording audio and video information, said disk having information stored thereon and having a damage, said disk including a central bearing area for holding and guiding thereof, a data medium layer having at least one data track path thereon, said data track being formed by mechanically impressing a pattern of pits into said data medium layer for storing said information thereon, thereafter covering said data track with a reflecting layer for reflecting a reading beam passing through a reading operation through a cover layer on said data medium layer, a protective layer having a determined thickness covering a reading face of said disk and said data medium layer, said reflecting layer being disposed between said protective layer and said cover layer so that said protective layer and said data layer are free of contact with each other and no information is stored in said protective layer, said protective layer having damages which cause disturbances during a reading operation by a playback apparatus and said damages require repair because said playback apparatus does not compensate for said damages and disturbances as recognized by a user, comprising the steps of:

removing material from said rigid digital recording disk having information stored thereon, forming said protective layer in a section between said central bearing area and a circumferential edge of said disc to a level at which said playback apparatus does not compensate for disturbances so that uncompensated for disturbances do not appear during a reading operation by said playback apparatus and said protective layer in said section has a thickness less than said determined thickness after removal of the material in said protective layer, grinding solely said protective layer with fine grained grinding means to carry out the operation of removing of said protective layer, said grinding being carried out only in directions cutting across the data track path, thereby avoiding production of traces extending along the data track path, and removing of said protective layer along secants of a circular disk, said secants being set at an of angle 45° one to another.

2. The method of claim 1, including:

carrying out the grinding operation only in those areas having damages thereby to reduce the thickness of the disk in said areas subjected to the grinding operation while said disk has a constant thickness overall.

3. The method of claim 2, including:
carrying out removal of said protective layer by several successive grinding steps; and
using a series of abrasive of increasing fineness in a step after step procedure until a surface quality of the grounded protective layer is achieved which is approximately equal to the surface quality of a newly manufactured disk so that the playback apparatus compensates for any disturbance.

4. The method of claim 3, including:
using a water-containing grinding paste in the final grinding steps.

5. The method of claim 1, including:
carrying out the grinding operation and reducing the thickness of the disk due to the grinding operation only in those areas having a disturbance causing damage.

6. The method of claim 5, including:
carrying out removal of said protective layer by several successive grinding steps; and
using a series of abrasive of increasing fineness in a step after step procedure until a surface quality of the grounded protective layer is achieved which is approximately equal to the surface quality of a newly manufactured disk so that the playback apparatus compensates for any disturbance.

7. The method of claim 6, including:
using a water-containing grinding paste in the final grinding steps.

8. The method of claim 1, including:
carrying out said grinding operation by avoiding any grinding operation at said central bearing area for maintaining an original thickness of said disk within said central bearing area.

9. The method of claim 2, including:
carrying out said grinding operation by avoiding any grinding operation at said central bearing area for maintaining an original thickness of said disk within said central bearing area.

10. The method of claim 5, including:
carrying out said grinding operation by avoiding any grinding operation at said central bearing area for maintaining an original thickness of said disk within said central bearing area.

11. The method of claim 1, including:
carrying out removal of said protective layer by several successive grinding steps; and
using a series of grained abrasives of increasing fineness in a step after step procedure until a surface quality of the ground protective layer is achieved which is approximately equal to the surface quality of a newly manufactured disk so that the playback apparatus compensates for any disturbance.

12. The method of claim 11, including:
using a liquid-containing a water-containing grinding paste in the final grinding steps.

13. The method of claim 11, including:
removing of a plastic material protective layer while maintaining the temperature of the disk below the softening temperature of said plastic material.

14. The method of claim 1, including;
carrying out said grinding of said protective layer for removing a plastic material protective layer while maintaining the temperature of said disk below the softening temperature of said plastic material.

15. A method for repairing a damaged rigid digital recording disk for recording audio and video information, said disk having information stored thereon and having a damage, said disk including a central bearing area for holding and guiding thereof, a data medium layer having at least one data track path thereon, said data track being formed by mechanically impressing a pattern of pits into said data medium layer for storing said information thereon, thereafter covering said data track with a reflecting layer for reflecting a reading beam passing through a reading operation through a cover layer on said data medium layer, a protective layer having a determined thickness covering a reading face of said disk and said data medium layer, said reflecting layer being disposed between said protective layer and said cover layer so that said protective layer and said data layer are free of contact with each other and no information is stored in said protective layer, said protective layer having damages which cause disturbances during a reading operation by a playback apparatus and said damages require repair because said playback apparatus does not compensate for said damages and disturbances as recognized by a user, comprising the steps of:
removing material from said rigid digital recording disk having information stored thereon, forming said protective layer in a section between said central bearing area and a circumferential edge of said disc to a level at which said playback apparatus does not compensate for disturbances so that uncompensated for disturbances do not appear during a reading operation by said playback apparatus and said protective layer in said section has a thickness less than said determined thickness after removal of the material in said protective layer,
grinding solely said protective layer with fine grained grinding means to carry out the operation of removing of said protective layer, said grinding being carried out only in directions cutting across the data track path, thereby avoiding production of traces extending along the data track path, and
carrying out said removing of said protective layer in radial directions of said disk if said disk has a spiral or a circular data track thereon, and
removing said protective layer along secants of a circular disc at an angle of 45° one to another.

16. The method of claim 15, including:
carrying out removal of said protective layer by several successive grinding steps; and
using a series of abrasive of increasing fineness in a step after step procedure until a surface quality of the ground protective layer is achieved which is approximately equal to the surface quality of a newly manufactured disk so that the playback apparatus compensates for any disturbance.

17. The method of claim 16, including:
using a water-containing grinding paste in the final grinding steps.

18. The method of claim 15, including:
carrying out said grinding operation by avoiding any grinding operation at said central bearing area for maintaining an original thickness of said disk within said central bearing area.

* * * * *